M. ZWERDLING.
CANDY WHISTLE MACHINE.
APPLICATION FILED JULY 11, 1916.
1,229,375.
Patented June 12, 1917.
3 SHEETS—SHEET 1.
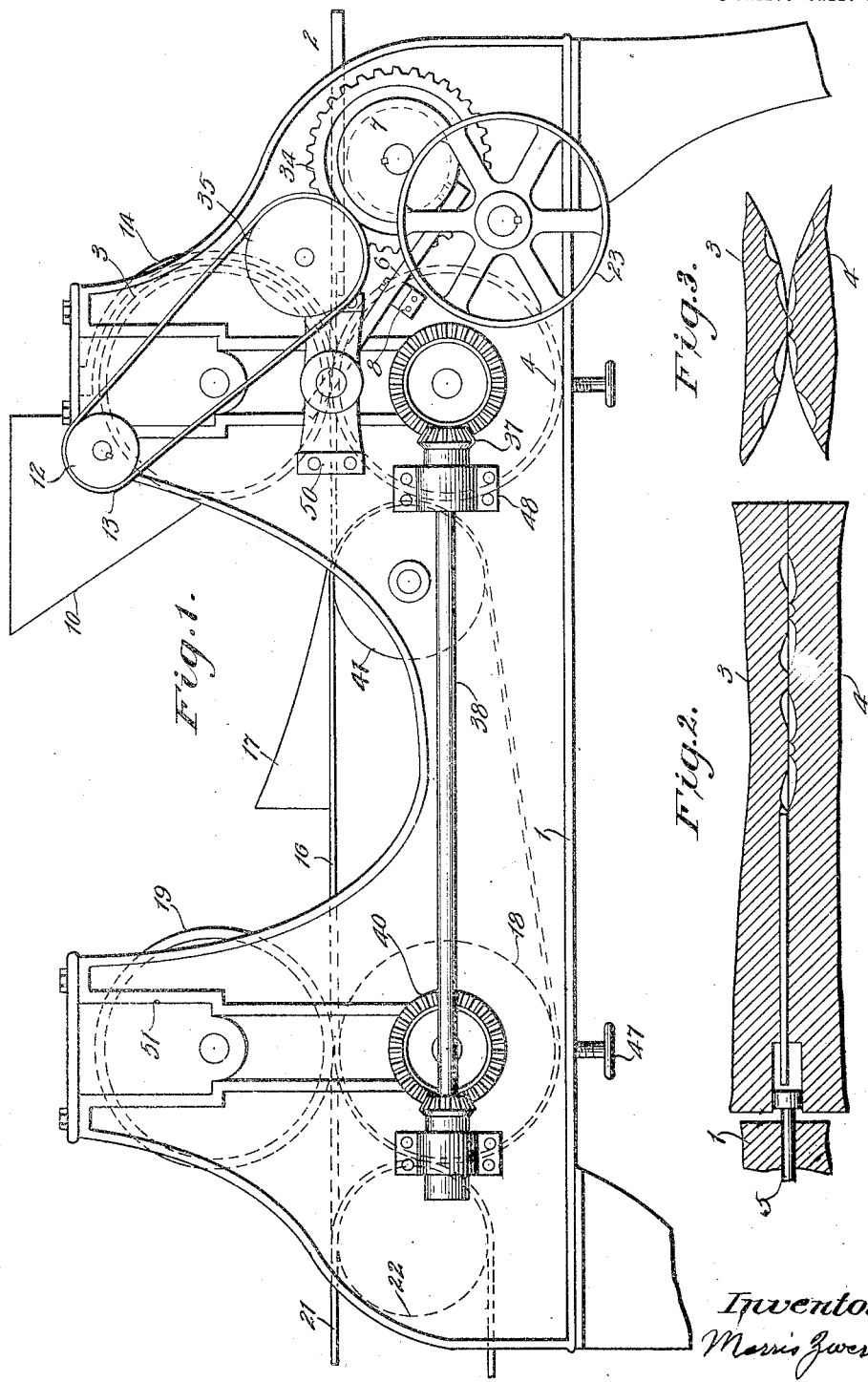
Inventor:
Morris Zwerdling

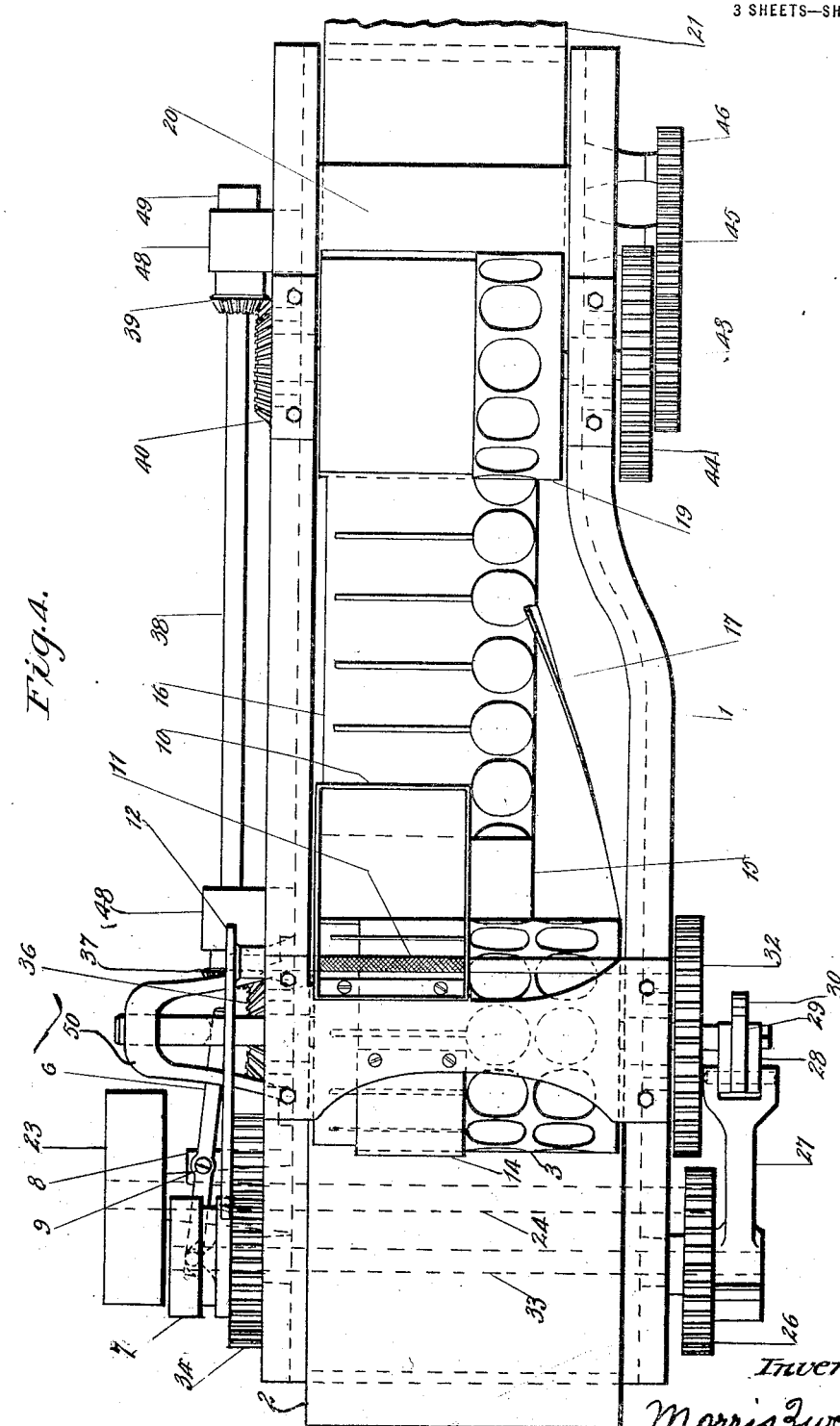

M. ZWERDLING.
CANDY WHISTLE MACHINE.
APPLICATION FILED JULY 11, 1916.
1,229,375.
Patented June 12, 1917
3 SHEETS—SHEET 3.
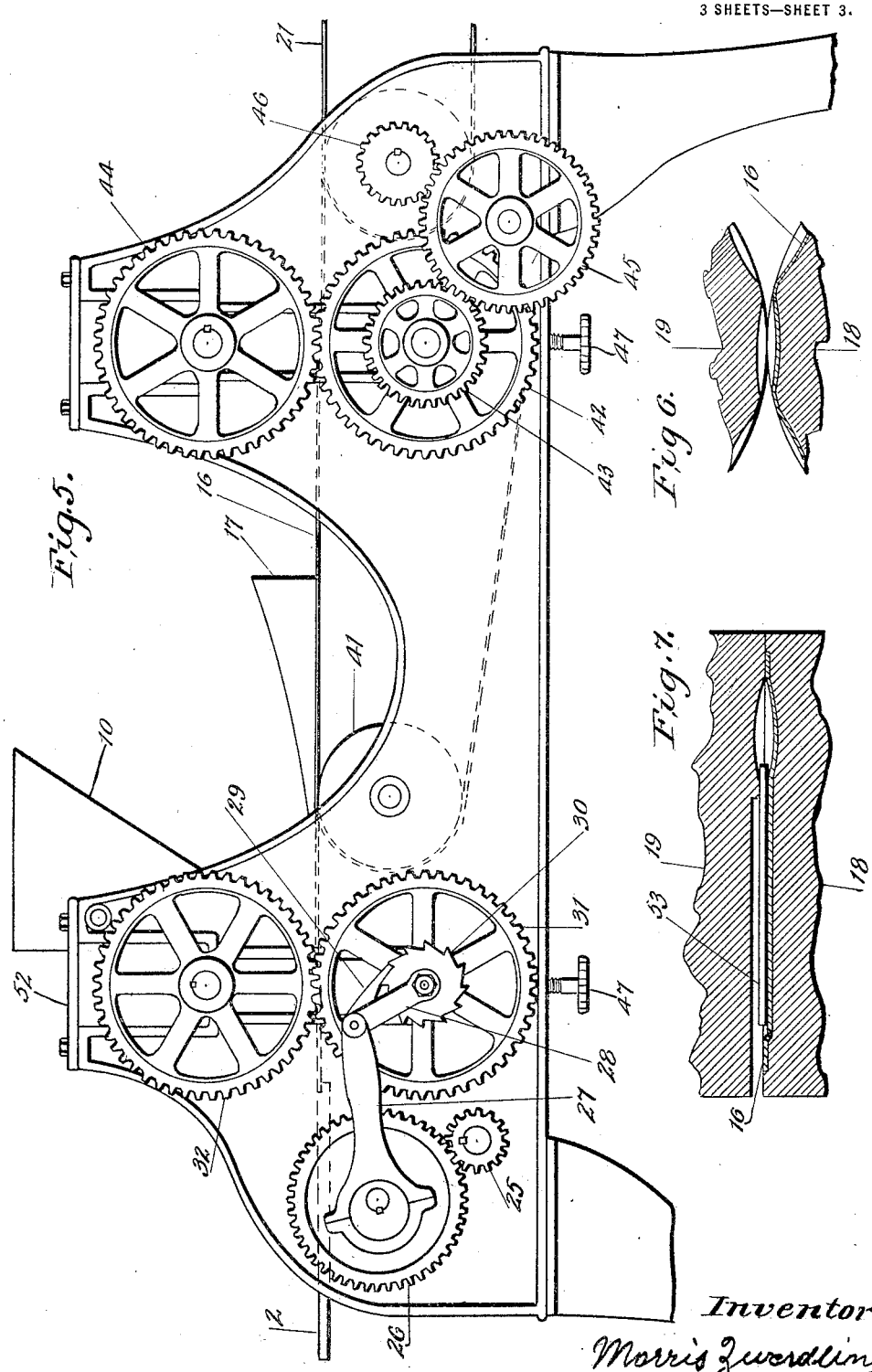
Inventor:
Morris Zwerdling

UNITED STATES PATENT OFFICE.

MORRIS ZWERDLING, OF NEW YORK, N. Y.

CANDY-WHISTLE MACHINE.

1,229,375.

Specification of Letters Patent.

Patented June 12, 1917.

Application filed July 11, 1916. Serial No. 108,737.

*To all whom it may concern:*

Be it known that I, MORRIS ZWERDLING, an intended citizen of the United States, and a resident of the city of New York, borough of Manhattan, in the county of New York and State of New York, have invented a new and Improved Candy-Whistle Machine, of which the following is a specification.

The invention relates to candy machines and has particular reference to a machine for making candy whistles with sticks inserted into them.

My invention comprises a machine which has means for forming from a mass of material candy whistles and to insert a stick in each candy while it is in the process of forming.

The objects of my invention will hereinafter be more fully described, claimed and illustrated in the drawings forming a part of this specification in which like characters of reference indicate corresponding parts in all views, and in which Figure 1, is a side elevation of the machine; Fig. 2, is a cut through the longitudinal axis of the first pair of rolls, Fig. 3, shows a side view of the first pair of rolls cut through the center of the cavities; Fig. 4, is a top or plan view of the machine embodying my invention in its preferred form; Fig. 5, is an elevation of the side opposite to the one shown in Fig. 1. Fig. 6, is a side view of the second pair of rolls cut through the center of the cavities; Fig. 7, shows a cut through the longitudinal axis of the second pair of rolls.

Referring more particularly to the drawings and the working of the machine, I show a suitable frame 1, a table 2 on which the candy dough is placed, from where it is drawn between the first pair of rollers 3 and 4.

These rolls have two rows of cavities for molding two halves of a candy whistle, which may have any geometrical shape or the form of an animal, bird or any object in nature or art.

It will be noticed in Fig. 2 and Fig. 3 that the center punch for making the hole in the whistle, which comes out from the roll 4 does not penetrate the candy, but has instead a small cavity on its tip, which molds a drop with very thin walls around it. When the candy is assembled and cooled off, that drop in the center falls out easily completing the whistle.

The roll 3 has long grooves on its surface, as shown on Fig. 2, one for each cavity of the first row and connecting with it. While the candy dough is being molded between the two rolls, a stick is pushed along the said groove into the first half of the candy whistle by means of a plunger 5, which is actuated by a lever 6 and a cam 7. The lever 6 is supported by a bracket 8 and fastened by a pivot screw 9. The plunger 5 has a slot into which is fitted the lever 6 so as the latter can push in and pull out the plunger according to the motion of the cam 7.

The power of the machine is furnished through a pulley 23 which drives the shaft 24, and pinion 25. The pinion 25 moves a gear 26 with an eccentric on it, which moves a connecting rod 27. The connecting rod 27 moves a fork 28 with a dog 29 in the center. The dog 29 moves a ratchet gear 30 which is keyed on to the shaft of the roller 4 thus giving it a step by step movement. A gear 31 is keyed on to the shaft of the roller 4 between the frame and the ratchet 30 and moves a gear 32 which is keyed on to the shaft of the roller 3, so that the two rolls move simultaneously. The gear 26 is keyed on to a shaft 33 which moves on the other end of it a gear 34 with a cam 7. The cam 7 is of the barrel type cams with a groove on its periphery in which slides the roller of the lever 6. The groove in the cam has in one place a swivel which pushes the roller to and from the frame of the machine. The cam 7 is so timed as to push the lever 6 and with it the plunger 5 to the frame when the grooves of the rolls 3 and 4 are in the center corresponding to the center of the plunger and in the process of forming the lumps of candy. The gear 34 moves a gear 35 which has a flange on which runs a belt 13, and moves the pulley 12.

The sticks come out from box 10 and fall into the grooves of the roller 3. The knurled shaft 11 which is driven by means of a pulley 12, and belt 13 helps to straighten out the sticks in the box 10. The cover 14 keeps the sticks from falling out from the grooves of the roller 3. The pressed out candy with the sticks in one half is passed over the table 15 to the belt 16. The half of the candy which contains the stick falls into the cavities of the belt 16 while the other half being slightly joined with the first half is sliding along on a curved plate 17 which gradually lifts it up from a horizontal position to a vertical position, when the second half by its gravity falls upon the first half. The belt 16 passes around the roller 18, and brings the two slightly joined halves of the candy between the two rollers 18 and 19, which press the two halves of the candy firmly together on its edges leaving the center as puffy as possible. After the candy has received its final shape between the rollers 18 and 19 it passes through the table 20 to a long conveyer belt 21 which is driven by a roller 22 where while traveling it cools off and falls at the end of the conveyer belt 21 into a convenient receptacle.

The shaft of the roller 3 carries a bevel gear 36 on the end opposite to the one which carries the ratchet 30. The bevel gear 36 moves another bevel gear 37 which is keyed on to a shaft 38. On the other end of the shaft 38 there is keyed a bevel gear 39 which moves another bevel gear 40 which is keyed on to the shaft of the roller 18. The roller 18 moves the belt 16 which also runs on an idler roller 41. The shaft of the roller 18 has a pair of gears 42 and 43 keyed on to it on the end opposite to the gear 44 which is keyed on to the shaft of the roller 19. The gear 43 moves an idler gear 45 which moves a gear 46. The gear 46 is keyed on to the shaft of the roller 22 which moves the conveyer belt 21. Screws 47 are provided for adjusting the height of the rollers 3 and 18. Brackets 48 are provided for holding the shaft 38. A collar 49 is provided for locking the shaft 38. A bracket 50 supports the plunger 5. Bearing blocks 51 support the rollers 3 and 19. Cross bar 52 locks the bearing blocks 51, and serves to support box 10, and cover 14. 53, Fig. 7 represents a stick which is used in the candies lying between the rollers 18 and 19.

Having thus described my invention, I claim as new and desire to secure by Letters Patent:—

1. In a candy whistle machine, the combination of a suitable frame two pairs of molding rolls mounted in said frame, the first pair of said rolls being placed one above the other and provided with two rows of companion cavities which extend peripherally around their surfaces adjacent each other and longitudinal grooves in the upper roll connecting with the first row of mold cavities on it, means for delivering sticks singly into said grooves, means for driving each stick along the grooves into the first half of the candy whistle molded in the cavities, means for rotating said rolls with regular intervals of rest and motion, means to convey the molded candy with the sticks attached to the first row, means for placing the second row of candies on the top of the first, means for driving a conveyer with the slightly joined halves of the candy whistle to and between the second pair of rolls, said rolls being placed one above the other and having companion cavities which extend peripherally around their surfaces and corresponding to the cavities of the conveyer and serving to press together the slightly joined halves of the candy whistle.

2. In a candy whistle machine the combination of a suitable frame, two pair of rolls mounted in said frame, the first pair of said rolls being placed one above the other and provided with two rows of companion cavities which extend peripherally around their surfaces adjacent each other and longitudinal grooves in the upper roll connecting with the first row of mold cavities on it, means for delivering sticks singly into said grooves, means for driving each stick along the grooves into the first half of the candy whistle while the rolls are at rest, means to connect the rolls for simultaneous movement with the same surface speed and with regular intervals of rest and motion, means for driving a conveyer at the same surface speed as that of the first pair of rolls, means for placing the second half of the candy whistle upon the first and means for driving the second pair of rolls at the same surface speed, as that of the conveyer, said rolls being placed one above the other and having companion cavities which extend peripherally around their surfaces and corresponding to the cavities of the conveyer.

3. In a candy whistle machine the combination of a suitable frame, a pair of rolls to mold two halves of the candy whistle, means for placing sticks into the first half of the candy, means for placing the second half of the candy upon the first, means for conveying the slightly joined candy, a pair of rolls for pressing together the slightly joined halves of the candy and means for carrying the finished candies away thereby cooling them off.

4. In a candy whistle machine the combination of a suitable frame, two pairs of rolls mounted in said frame the first pair of said rolls being placed one above the other and provided with two rows of companion cavities which extend peripherally around their surfaces adjacent each other and longitudinal grooves in the upper roll connecting with the first row of mold cavities on it, said cavities being of such a shape as to form two halves of a candy whistle which will be formed upon folding the halves one upon the other leaving the central hole slightly closed.

5. In a candy whistle machine the combination of a suitable frame, means for forming two halves of a candy whistle, said halves being slightly connected together, a conveyer with cavities along one edge adapted to receive one half of the candy with the stick inserted into it, the other half of the candy being engaged simultaneously by a curved surface alongside of said conveyer in order that it may rise from a horizontal position to a vertical, where gravity will act upon it to drop it upon the first half, means to press together the slightly joined halves of the candy and means for cooling off the finished product.

MORRIS ZWERDLING.